United States Patent [19]

Hayner et al.

[11] Patent Number: 6,001,162

[45] Date of Patent: Dec. 14, 1999

[54] SULFUR-TREATED ASPHALT COMPOSITIONS AND THEIR PREPARATION

[75] Inventors: Roger E. Hayner, Russell; David P. Wesley, Ashland, both of Ky.

[73] Assignee: Marathon Ashland Petroleum LLC, Finlay, Ohio

[21] Appl. No.: 08/895,796

[22] Filed: Jul. 17, 1997

[51] Int. Cl.[6] .................................................. C09D 195/00
[52] U.S. Cl. ............................................................ 106/274
[58] Field of Search ............................................. 106/274

[56] References Cited

U.S. PATENT DOCUMENTS

| | | | |
|---|---|---|---|
| 123,458 | 2/1872 | Crawford | 106/274 |
| 1,163,593 | 12/1915 | Forrest | 106/274 |
| 1,266,261 | 9/1918 | Henderson | 106/274 |
| 1,353,003 | 9/1920 | White, Jr. | 106/274 |
| 3,970,468 | 7/1976 | Garrigues et al. | 106/274 |
| 4,130,516 | 12/1978 | Gagle et al. | 106/274 |
| 4,154,619 | 5/1979 | Pronk | 106/274 |
| 4,211,575 | 7/1980 | Burris | 106/274 |
| 4,283,231 | 8/1981 | Clementoni et al. | 108/274 |
| 4,713,117 | 12/1987 | Goodrich | 106/274 |
| 5,371,121 | 12/1994 | Bellomy et al. . | |
| 5,374,672 | 12/1994 | Chaverot et al. . | |
| 5,601,697 | 2/1997 | Miller et al. | 208/945 |
| 5,627,225 | 5/1997 | Gorbaty et al. | 524/71 |

FOREIGN PATENT DOCUMENTS

| | | | |
|---|---|---|---|
| 764861 | 8/1967 | Canada | 6/162 |

*Primary Examiner*—David Brunsman
*Attorney, Agent, or Firm*—Richard D. Stone; Laurence P. Hobbes

[57] ABSTRACT

A method is provided for preparing asphalt composition, e.g., solvent deasphalting (SDA)-produced asphalt composition comprising a mixture containing SDA bottoms with or without vacuum tower bottoms and lube plant extract, which method comprises treating the asphalt composition with 0.05 to 0.5 wt % reactive sulfur under conditions sufficient to improve rheological properties of said composition as measured by increased complex shear modulus relative to a corresponding untreated mixture. The invention further relates to such asphalt composition and paving composition containing same.

20 Claims, 4 Drawing Sheets

PERFORMANCE GRADED ASPHALT BINDER (AASHTO MP1)

| PERFORMANCE GRADE | PG-52 | | | | | | | PG-58 | | | | | | PG-64 | | | | | PG-70 | | | | |
|---|---|---|---|---|---|---|---|---|---|---|---|---|---|---|---|---|---|---|---|---|---|---|---|
| | -10 | -16 | -22 | -28 | -34 | -40 | -46 | -16 | -22 | -28 | -34 | -40 | -16 | -22 | -28 | -34 | -40 | -10 | -16 | -22 | -28 |
| 7 DAY MAX TEMP °C | <52 | | | | | | | <58 | | | | | <64 | | | | | <70 | | | |
| MIN TEMP °C | >-10 | >-16 | >-22 | >-28 | >-34 | >-40 | >-46 | >-16 | >-22 | >-28 | >-34 | >-40 | >-16 | >-22 | >-28 | >-34 | >-40 | >-10 | >-16 | >-22 | >-28 |
| ORIGINAL BINDER | | | | | | | | | | | | | | | | | | | | | |
| FLASH POINT | 230 | | | | | | | | | | | | | | | | | | | | |
| VISCOSITY TEST TEMP °C | 135 | | | | | | | | | | | | | | | | | | | | |
| DYNAMIC SHEAR | 52 | | | | | | | 58 | | | | | 64 | | | | | 70 | | | |
| ROLLING THIN FILM OVEN TEST RESIDUE (AASHTO T 240) | | | | | | | | | | | | | | | | | | | | | |
| MASS LOSS, MAX PERCENT | 1.0 | | | | | | | | | | | | | | | | | | | | |
| DYNAMIC SHEAR | 52 | | | | | | | 58 | | | | | 64 | | | | | 70 | | | |
| PRESSURE AGING VESSEL RESIDUE (AASHTO PP1) | | | | | | | | | | | | | | | | | | | | | |
| PAV AGING °C | 90 | | | | | | | 100 | | | | | 100 | | | | | 100/(110)°C | | | |
| DYNAMIC SHEAR | 25 | 22 | 19 | 16 | 13 | 10 | 7 | 25 | 22 | 19 | 16 | 13 | 28 | 25 | 22 | 19 | 16 | 34 | 31 | 28 | 25 |
| CREEP STIFFNESS | 0 | -6 | -12 | -18 | -24 | -30 | -36 | -6 | -12 | -18 | -24 | -30 | -6 | -12 | -18 | -24 | -30 | 0 | -6 | -12 | -18 |
| DIRECT TENSION | 0 | -6 | -12 | -18 | -24 | -30 | -36 | -6 | -12 | -18 | -24 | -30 | -6 | -12 | -18 | -24 | -30 | 0 | -6 | -12 | -18 |

FIG. 4

SULFUR-TREATED ASPHALT COMPOSITIONS AND THEIR PREPARATION

BACKGROUND OF THE INVENTION

I. FIELD OF THE INVENTION

The invention relates to asphalt compositions containing i) an asphalt component, e.g., asphalt from vacuum bottoms or solvent-deasphalted bottoms and ii) an optional fluxing component, e.g., lube plant extract, and to a process for the improvement of their rheological properties. The invention further relates to modified asphalt compositions useful in a variety of applications, particularly paving asphalts, and to construction methods.

II. DESCRIPTION OF THE PRIOR ART

Solvent deasphalting (extraction of asphalts from heavy petroleum stocks) is a well-known petroleum process and is described in U.S. Pat. No. 3,951,781 to Owen (Mobil); U.S. Pat. No. 3,968,023 to Yan (Mobil); U.S. Pat. No. 3,972,807 to Uitti (UOP); U.S. Pat. No. 3,975,396 to Bushnell (Exxon); U.S. Pat. No. 3,981,797 to Kellar (UOP); U.S. Pat. No. 3,998,726 to Bunas (UOP); U.S. Pat. No. 4,017,383 to Beavon (Ralph M. Parsons); U.S. Pat. No. 4,054,512 to Dugan (Exxon); U.S. Pat. No. 4,101,415 to Crowley (Phillips); U.S. Pat. No. 4,125,458 to Bushnell (Exxon); and numerous others. Specific proprietary processes include the SOLVAHL solvent deasphalting process licensed by Institute Francais de Petrole, and the low-energy deasphalting process licensed by Foster Wheeler, U.S.A., shown schematically in FIG. 1. Deasphalting processes also include the ROSE supercritical fluid technology licensed by Kerr-McGee Corporation.

U.S. Pat. No. 5,601,697 to Miller et al. teaches SDA-produced asphalts (containing solvent deasphalting bottoms) made by blending SDA bottoms with aromatic extract. Preferably the extract is produced from an extraction process such as that employed in lubricating oil production. In one aspect, the asphalt can contain added polymers which can be vulcanized in situ with the asphalt by using sulfur and accelerators. No mention is made of the amount of sulfur added. The blending process produces asphalts of superior characteristics, e.g., PG64-22, which can meet the new Strategic Highway Research Program (SHRP) specifications for dynamic sheer, creep stiffness, and direct tension (tensile strength). As the new SHRP asphalt specifications impact the marketplace, particularly aided by the recent increases in federal funds for highway construction and repair, these new asphalt products will be particularly advantageous.

III. PROBLEMS PRESENTED BY PRIOR ART

At higher temperatures (58° to 76° C. (136° to 169° F.)), SDA-produced AC20 asphalts comprising lube plant extracts exhibit a higher potential for rutting according to SHRP testing when compared to asphalts produced by conventional means. The addition of lube plant extract produces a material which reacts to increased loading speeds more as an oil (Newtonian fluid) than as conventional asphalt (viscoelastic fluid). Conventionally-made asphalt enjoys a higher storage modulus, allowing it to store more energy from loading and thus preventing rutting from displacement. Accordingly, it would be advantageous to provide a way to modify the rheological properties of SDA-produced asphalt so as to improve its resistance to rutting at higher temperatures.

Sulfur has been used as a modifier for asphalt, by itself or with polymers, for vulcanization properties. U.S. Pat. No. 123,458 to Crawford discloses bituminous binders comprising asphalt, distilled coal tar, Crawford's redistilled oil and sulphur (2.2 wt %). U.S. Pat. No. 1,163,593 to Forrest describes a refining process for natural asphalts which prevents loss of naturally occurring sulfur found in crude oils which are refined to produce asphalt compositions. Hydrogen sulfide liberation is minimized by utilizing fixed oils to absorb sulfur. U.S. Pat. No. 1,266,261 to Henderson discloses premixing coal tar pitch and 6 to 14% sulfur in volatile petroleum and thereafter driving off the added petroleum. U.S. Pat. No. 1,353,003 to White, et al. describes acid- and alkali-resistant coatings containing coal tar pitch and crystallized sulfur which are prepared at low temperatures in order to prevent reaction of the pitch with sulfur. The sulfur is added to increase viscosity and reduce the melting point of the pitch. U.S. Pat. No. 3,739,853 to Kopvillem discloses sulfur addition to asphalt at 100% or more of asphalt content to produce an asphalt casting composition. U.S. Pat. No. 3,970,468 to Garrigues, et al. discloses sulfur emulsions in asphalt prepared by dispersion of 15 to 100 parts molten sulfur in 100 parts asphalt under high shear. U.S. Pat. No. 4,154,619 to Pronk describes the use of polysiloxane stabilizer for sulfur dispersed in bitumen. Sulfur is employed at levels of 20% to 50% of the bitumen and organosiloxane at 0.1% or less of bitumen. U.S. Pat. No. 4,211,575 to Burris discloses a process for producing asphaltic emulsions containing 10% to 50% sulfur, in the asphalt phase, utilizing a hydrocarbon solvent for softening. The sulfur is added to bitumen at temperatures below 152° C. (305° F.) to avoid evolving hydrogen sulfide. The composition is emulsified to produce an asphalt emulsion for pothole repair. U.S. Pat. No. 5,371,121 to Bellomy, et al. describes polymer-modified bitumen compositions which are mixtures of paving asphalt, styrene-butadiene block copolymer containing plasticizer oil, and 0.25% sulfur. U.S. Pat. No. 5,374,672 to Chaverot, et al. discloses an asphalt/polymer composition produced by mixing polymer, e.g., styrene and butadiene copolymer, with asphalt and then incorporating at 100° C. to 230° C. (220° to 446° F.) a sulphur-donating coupling agent in an amount suitable for providing an amount of elemental or radical sulphur representing 0.5 to 10% of the weight of the polymer. Canadian Patent No. 764,861 to Pethrick, et al. describes a bituminous composition containing i) propane precipitated asphalt which is sulfurized by the addition of 2 to 20 wt % of sulfur, ii) lube plant extract and iii) a vacuum residue. The vacuum residue is added to provide higher temperature susceptibility.

The prior art has utilized large amounts of sulfur (greater than 1 wt %) to make asphalts resistant to rutting. However, the addition of such amounts of sulfur can impart undesired brittleness resulting in premature failure of the asphalt in its use, e.g., as road surfaces.

SUMMARY OF THE INVENTION

I. GENERAL STATEMENT OF THE INVENTION

Accordingly, the present invention provides a method for preparing asphalt composition free of added polymer, comprising an asphalt component, e.g., solvent deasphalting bottoms, and an optional fluxing component, e.g., lube plant extract, which method comprises treating said asphalt composition with 0.05 to 1.0 wt % reactive sulfur under conditions sufficient to improve rheological properties of said composition as measured by increased complex shear modulus relative to a corresponding untreated mixture. The present invention further provides said asphalt compositions, as well as pavement compositions containing aggregate and said asphalt compositions.

The present invention also provides a method for preparing solvent deasphalting (SDA)-produced asphalt composition comprising a mixture containing SDA bottoms and lube plant extract, which comprises treating said mixture with 0.05 to 1.0 wt % reactive sulfur under conditions sufficient to improve rheological properties of said composition as measured by increased complex shear modulus relative to a corresponding untreated mixture.

In another aspect, the invention relates to an asphalt composition, free of added polymer, e.g., an asphalt composition comprising a mixture containing solvent deasphalting bottoms, and lube plant extract, which mixture is treated with 0.05 to 1.0 wt % reactive sulfur under conditions sufficient to improve rheological properties of said composition as measured by increased complex shear modulus relative to a corresponding untreated mixture.

In yet another aspect, the invention relates to a pavement composition comprising an aggregate or aggregate material and from 1.0% to 10.0% of a paving asphalt composition comprising a mixture containing solvent deasphalting bottoms and lube plant extract, which mixture is treated with 0.05 to 1.0 wt % reactive sulfur under conditions sufficient to improve rheological properties of said composition as measured by increased complex shear modulus relative to a corresponding untreated mixture.

The mixture containing solvent deasphalting bottoms and lube plant extract can contain 0.5 to 95 wt %, preferably 5 to 90 wt %, more preferably 10 to 80 wt %, SDA bottoms, e.g., those obtained from solvent extraction of vacuum bottoms, said SDA bottoms having Ring and Ball Softening Points ranging from 40° to 120° C., boiling points greater than 510° C. (950° F.), preferably greater than 540° C. (1000° F.); and 0.5 to 50 wt %, preferably 3 to 30 wt % lube plant extract of boiling range 93° to 704° C. (200° to 1300° F.), preferably 121° to 593° C. (250° to 1100° F.), e.g., those obtained from lubricant production. In one embodiment, 0.5 to 90 wt % of vacuum bottoms from vacuum distillation may be added to the mixture as well. The conditions for treatment with reactive sulfur comprise heating at temperatures of 100° to 300° C. (220° to 572° F.), preferably 110° to 250° C. (230° to 482° F.), for 0.1 to 5 hours, preferably 0.2 to 2 hours, e.g., 0.5 to 0.8 hour.

Reactive sulfur utilized in the present invention can be added to the mixture in the form of elemental sulfur, including sulfur recovered from the refining process of crude oils, or in the form of reactive sulfur compounds, e.g., polysulfides, in amounts of 0.05 to 1.0 wt % sulfur, preferably 0.1 to 0.5 wt % sulfur, e.g., 0.05 to 0.2 wt %. Sulfur compounds in which the sulfur is tightly bound and thus unreactive under the treatment conditions set out above.

ASPHALT COMPONENTS

Suitable asphalt components include a variety of organic materials, solid or semi-solid at room temperature, which gradually liquify when heated, and in which the predominate constituents are naturally occurring bitumens, e.g., Trinidad Lake, or residues commonly obtained in petroleum, synthetic petroleum, or shale oil refining, or from coal tar or the like. For example, vacuum tower bottoms produced during the refining of conventional or synthetic petroleum oils are a common residue material useful as asphalt composition. In a preferred embodiment of the present invention, the asphalt component comprises solvent deasphalting bottoms.

SDA Bottoms

Solvent deasphalting bottoms are obtained from suitable feeds such as vacuum tower bottoms, reduced crude (atmospheric); topped crude, and preferably hydrocarbons comprising an initial boiling point of about 450° C. (850° F.) or above. Preferably the solvent deasphalting bottoms are obtained from vacuum tower bottoms, preferably boiling above 538° C. (1000° F). Solvent deasphalting can be carried out at temperatures of 93°–148° C. (200–300° F.). After solvent deasphalting, the resulting SDA bottoms have a boiling point above 510° C. (950° F.), preferably above 540° C. (1000° F.), and a penetration of 0 to 70 dmm @ 25° C. (77° F.), preferably 0 to 50 dmm @ 25° C. (77° F.).

FLUXING COMPONENTS

Suitable fluxing components are added to improve the flow properties of the asphalt composition and can improve the penetration for a desired softening point. Such fluxing components can include paraffinic as well as aromatic materials, e.g., gas oils (which can contain both isoparaffins and monoaromatics). Gas oils include neutral oils, including hydrocracked or isodewaxed neutral oils. Suitable paraffinic fluxing components include paraffinic oils having at least 50 wt % paraffins content (isoparaffins and normal paraffins) such as footes oil (which is highly paraffinic and obtained from deoiling slack wax), as well as slack wax itself. Poly(alphaolefins) (PAOs) are also suited for use as fluxing components. Aromatic oils such as lube plant extract are especially useful in the present invention.

The footes oil suited to use in the present invention can be a by-product in the production of paraffin wax and can be the first footes oil fraction obtained from slack wax derived from a medium lubricating oil distilled from a mineral oil. The footes oil can be prepared by feeding a waxy petroleum crude oil to a crude still and taking off various cuts including a cut called medium lube distillate which is the preferred source of the footes oil used in this invention and which boils primarily in the range of 700° to 1000° F., preferably 800° to 900° F., and has an API specific gravity of 26, e.g., 25.5 to 26.5. This medium lube distillate may advantageously be further refined to improve color stability by solvent extraction using, e.g., phenol or furfural to remove aromatic type compounds. The lube distillate or the raffinate from solvent extraction is further refined by dewaxing, often at relatively low temperatures of, for example, –10° F., using various solvents or mixtures of solvents such as methyl ethyl ketone, benzene, acetone, and toluene to produce, after removal of the solvent, what is called a base lube oil stock and a slack wax. The slack wax is further refined to produce a deoiled slack wax and a footes oil, for instance, by further solvent extraction, using the same solvents but at higher temperatures, e.g., about 45° F., as in the dewaxing step above or by sweating.

The footes oil employed in the present invention can be relatively low in aromatic compounds and is composed principally of n-paraffins, isoparaffins and monocyclic naphthenes. More specifically, the composition of the footes oil used can be about 40–50 wt % n-paraffins, 5–15 wt % iso-paraffins, 35–45 wt % monocyclic naphthenes and 1–5 wt % aromatics.

The lube plant extract can be produced by solvent extraction processes providing a concentrate which is extracted from a suitable heavy petroleum stream, e.g., waxy distillate (WD) which, after dewaxing, produces a wax-free lube oil preferably having a viscosity ranging from 10 to 1000 SUS, preferably 50 to 800 SUS, e.g., 330 SUS at 100° F. (330 extract). Any suitable aprotic solvent extractor may be employed, e.g., sulfolane, furfural, or N-methylpyrollidone, with furfural especially preferred. The lube plant extract such as 330 extract can preferably be from a lube oil plant but can be from other extraction steps in hydrocarbon refining processes.

ASPHALT CEMENT

The asphalt composition of the present invention may optionally include an asphalt cement component of reduced viscosity relative to the SDA bottoms component. Such asphalt cement component can have a viscosity of 100 to 5000 poises at 60° C. (140° F.), preferably 250 to 4000 poises, e.g., 500 poises for AC5 asphalt cement. The asphalt cement component is added in amounts sufficient to provide the resulting asphalt composition with the desired viscosity for the intended application, e.g., 2000 poises at 60° C. (140° F.) for paving applications. For Performance Graded Applications, the asphalt compositions will have a G*/sin delta value in excess of 1.0 kPa at temperatures ranging from 46 to 82° C., preferably 52 to 76° C. Generally, the asphalt compositions of the present invention may contain from 0 to 95 wt %, preferably from 0 to 80 wt %, e.g., 5 to 95 wt %, of such asphalt cement component. The asphalt cement component of reduced viscosity can be obtained from any suitable source, e.g., atmospheric distillation bottoms.

POLYMER ADDITIVES

Particularly useful is the addition of styrene butadiene copolymers or SBS (styrene butadiene styrene) to the blended asphalt products of the present invention which contain SDA bottoms. While the invention is not to be limited to any theory, these copolymers apparently cause polymerization with the solvent deasphalted blends of the invention, and the aromatic oils in the asphalt blends help to solubilize the copolymers into the asphalt, providing substantially improved stability. Suitable polymers include styrene-butadiene, polysulfides such as ditertiododecyl pentasulfide or dinonyl pentasulfide such as those taught in U.S. Pat. No. 4,554,313 to Hagenbach (assigned Elf); U.S. Pat. No. 4,242,246 to Maldonado (Elf); U.S. Pat. No. 4,162,999 to Bohemen (British Petroleum); U.S. Pat. No. 5,120,777 to Chaverot (Elf); U.S. Pat. No. 4,567,222 to Hagenbach (Elf); U.S. Pat. No. 5,118,733 to Gelles (Shell); U.S. Pat. No. 5,039,342 to Jelling (National Patent Development); U.S. Pat. No. 5,023,282 to Neubert (GenCorp); U.S. Pat. No. 3,238,173 to Bailey (Shell); U.S. Pat. No. 4,585,816 to Vitkuske (Dow Chemical) (diene/vinyl aromatic block copolymers, e.g. methylstyrene, tertiary butyl styrene, etc.); U.S. Pat. No. 5,059,300 to McGinnis (Chevron) (phosphoric acid); U.S. Pat. No. 4,393,155 to Garrett (Ashland Oil) (polyacrylamides). It is especially preferred to add styrene-butadiene copolymers or styrene-butadiene-styrene (SBS) copolymers to the blended asphalt products of the present invention. Such copolymers are added in amounts comprising 0.1 to 20 wt %, preferably 0.5 to 12 wt % copolymers.

II. UTILITY OF THE INVENTION

The present invention is useful for the production of valuable high-specification asphalts having increased resistance to rutting at high temperatures (46° to 82° C.), as outlined in the Performance Based PG Specifications contained in AASHTO MP-1.

BRIEF DESCRIPTION OF THE DRAWINGS

FIG. 4 is a summary of SHRP asphalt binder specifications.

DESCRIPTION OF THE PREFERRED EMBODIMENTS

EXAMPLE 1

(The Invention)

Figure 1:
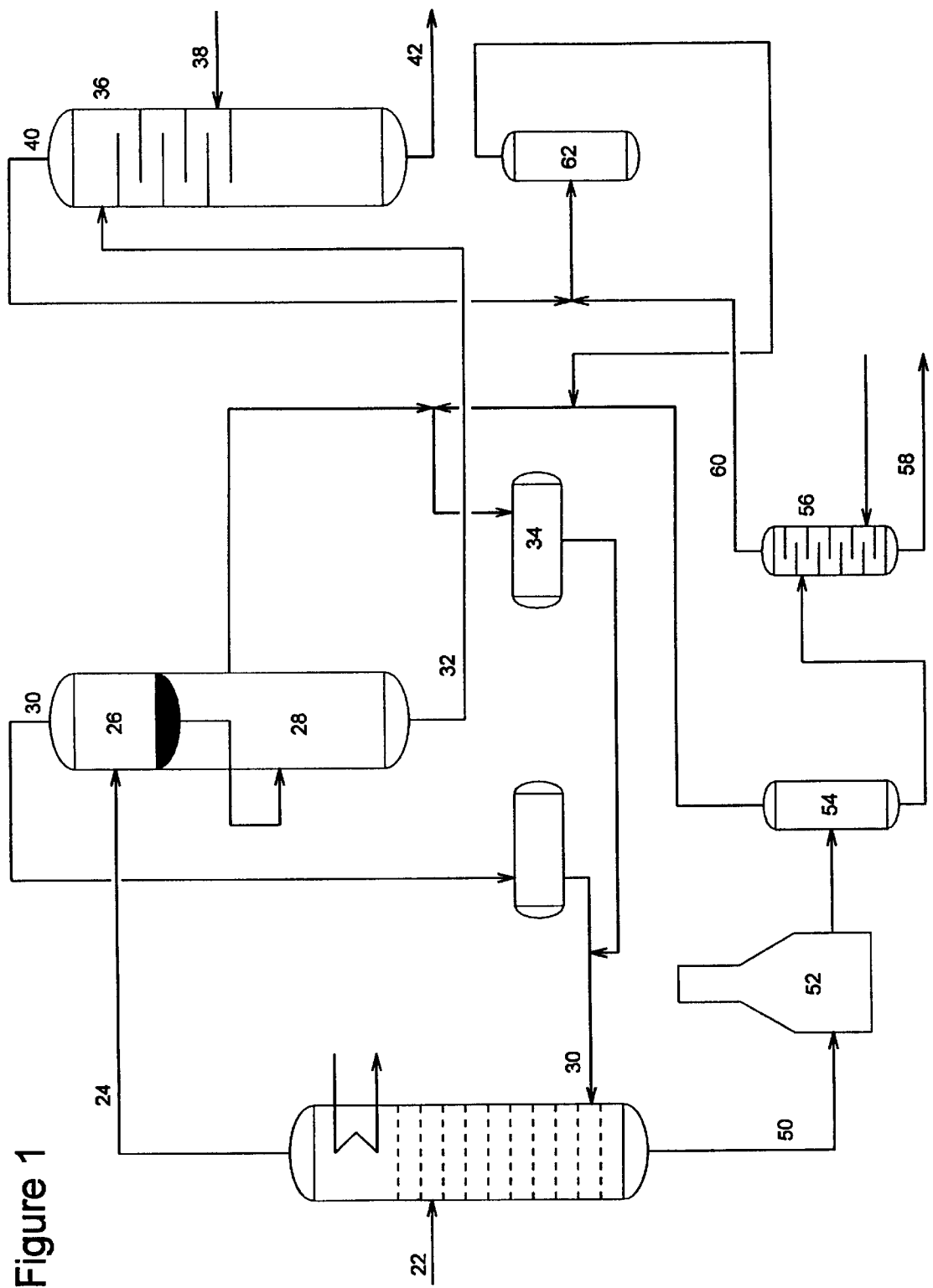
FIG. 1 is a schematic diagram of a typical Foster Wheeler solvent deasphalting (SDA) unit.

Referring to FIG. 1, a conventional solvent deasphalting (SDA) unit (process licensed from Foster Wheeler) comprises disc contactor 20 in which feed from storage 22, preferably vacuum tower bottoms boiling above about 538° C. (1000° F.), is contacted with high pressure solvent comprising butane, pentane, hexane, heptane, or mixtures thereof at temperatures of about 93–149° C. (200–300° F.) at a pressure above the vapor pressure of the solvent. Overheads 24 from the rotating disc contactor are sent to high pressure flash drum 26 and low pressure flash drum 28 where an overhead 30 is removed for recycle back to the rotating disc contactor 20 as high pressure solvent 30. The low pressure solvent 32 goes to low pressure solvent surge drum 34 and can also be recycled as high pressure solvent 30. Low pressure solvent 32 goes to the deasphalted oil (DAO) stripper 36 where it is treated with superheated steam 38 to produce an overhead 40 which is residual solvent for recovery and recycle, and a bottoms DAO product 42 which is sent to storage.

The bottoms 50 from rotating disc contactor 20 are passed through asphalt mix heater 52 and asphalt flash tower 54 to asphalt stripper 56 which is fed superheated steam and produces a bottoms pitch 58 for blending and storage in accordance with the invention, i.e., blending with lube plant extract, optional asphalt cement and addition of sulfur, and an overhead 60 which is sent through knock-out drum 62 for recycle back to the asphalt flash tower.

Figure 2:
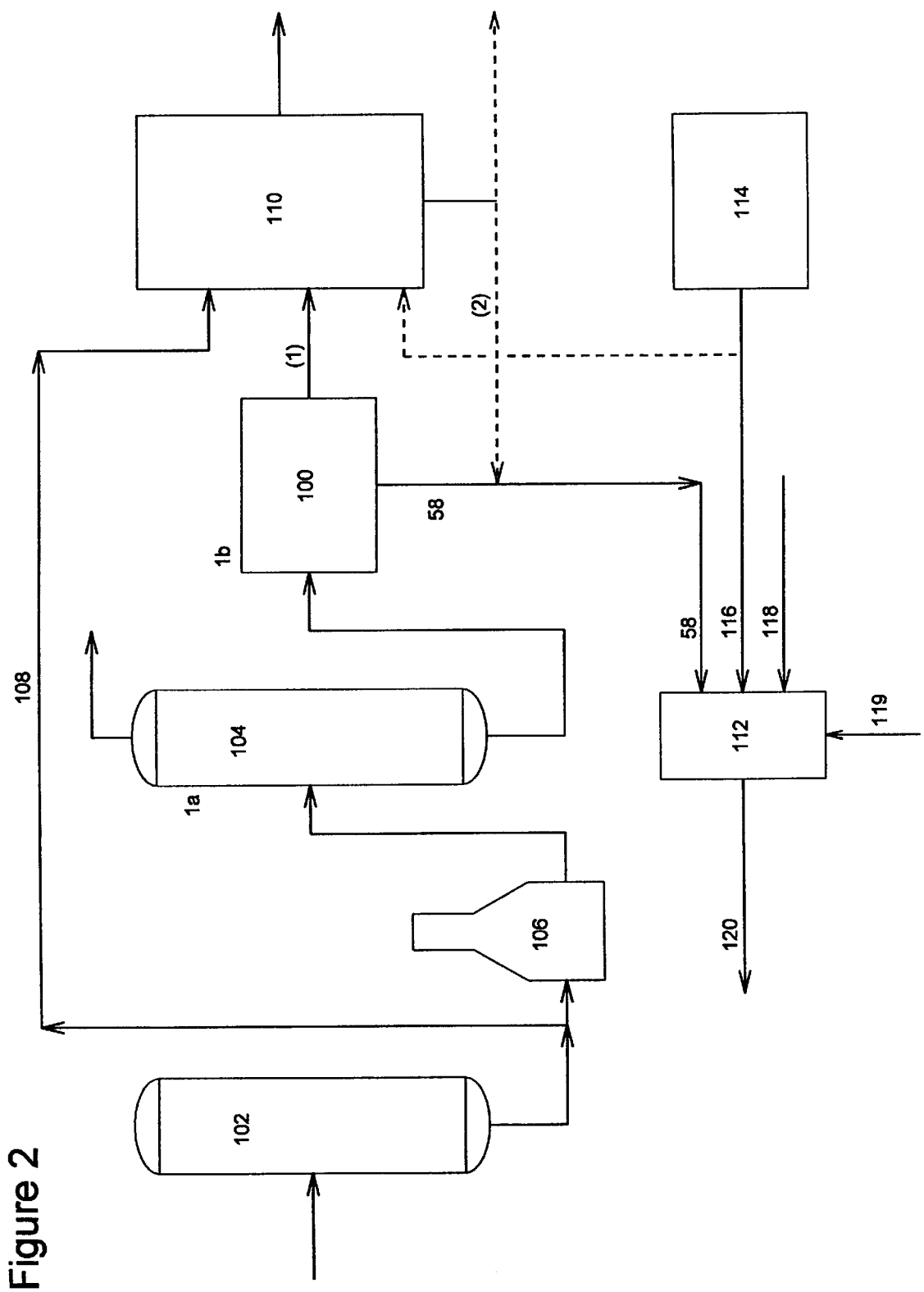
FIG. 2 shows the invention processing crude tower bottoms with solvent deasphalting and the addition to the SDA bottoms of lube oil plant lube plant extract, lower viscosity asphalt cement, and sulfur, as well as showing the interconnection of recycles and products from the various steps SDA 100, RCC 110, and Lube Plant 114.

FIG. 2 shows the entire solvent deasphalting unit 100 as a single box fed by crude oil fractions passing through crude tower 102 and vacuum tower 104 with intermediate heater 106. A portion of the crude tower bottoms, atmospheric tower reduced crude 108 is sent to the RCC unit 110, described in more detail in U.S. Pat. Nos. 4,347,122, 4,341,624, 4,414,098, 4,431,515, or 4,444,651. As shown in FIG. 2, pitch 58, described with reference to FIG. 1, flows from the solvent deasphalting unit 100 into asphalt blending unit 112. A lube plant 114 extracting with sulfolane, furfural, or the like (described more fully in *Petroleum Processing Handbook*, pp 3-86–3-87, 1967), produces an extract 116 which is also sent to the asphalt blending unit. (For ease in pumping, a portion of extract 116 may be blended with pitch 58 to reduce its viscosity prior to pumping into asphalt blending unit 112.)

Preferably, a stream of asphalt cement 118 of 500 poises viscosity at 140° F. is additionally added to asphalt blending unit 112, though the asphalt blending unit can produce AC20 (or 40, or whatever is desired for the product specifications at the time) by blending pitch 58 only with extract 116.

After addition of the lube plant extract and asphalt cement (if employed), sulfur 119 is added to the asphalt blending unit at temperatures of 100 to 250° C. and blended for a time sufficient to effect the rheological/viscosity properties, about 0.1 to 2 hours.

While FIG. 2 shows lube plant 114, another extraction unit producing aromatics from a variety of heavy petroleum streams (such as a furfural, sulfolane extractor, an N-methylpyrollidone, or other aprotic solvent extractor) can be substituted for the lube plant.

Dotted line (2) shows an alternate processing of the pitch from the SDA if slurry from the RCC (or other cracking unit)

can be used as a diluent. Still a further alternative is to feed the extract to a fluid catalytic cracker (FCC), with or without hydrotreating the extract. The line marked "(2)" shows an alternate addition of slurry oil to the asphalt blending where this can be done and still produce an on-spec blended pitch 120, such as AC20.

Figure 3:
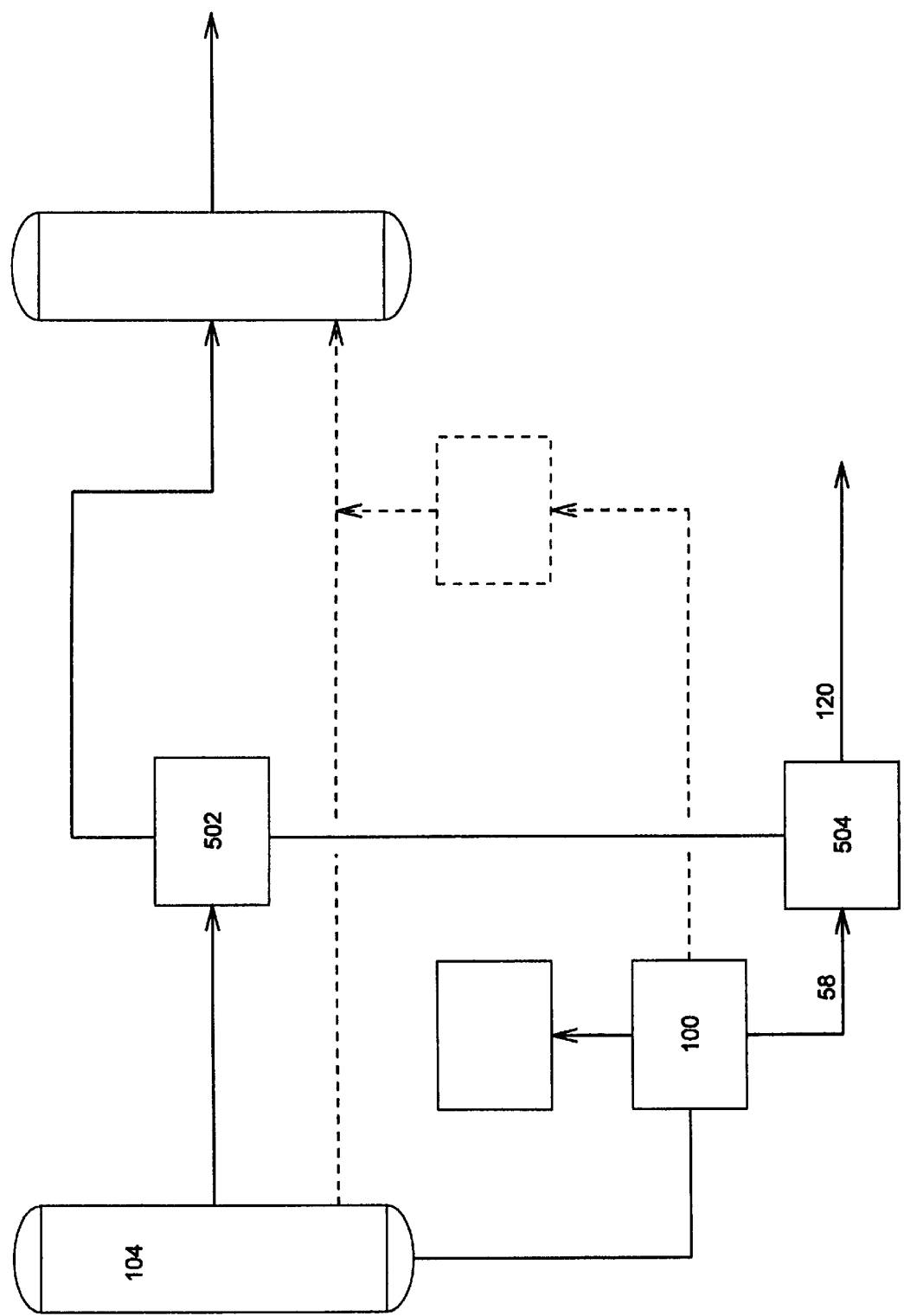
FIG. 3 shows the invention processing crude tower bottoms with solvent deasphalting and aromatics extraction as an alternative to the process of FIG. 2.

FIG. 3 shows schematically an alternative which omits the lube plant extract feed from the process of FIG. 2 described above.

Referring to FIG. 3, vacuum tower 104 receives feed from a crude tower (not shown) and outputs bottoms to an SDA unit 100 similar to that shown in FIG. 1. Vacuum tower 104 also outputs a midstream which goes to extractor 502 which produces a raffinate sentt to an FCC or RCC fluid cracking unit to produce transportation fuels. (In conventional operation, the dotted line marked conventional would be employed to bypass the extractor and send vacuum tower midcut directly to the FCC or RCC.) The SDA also outputs overhead deasphalted oil which can be sent to FCC or RCC.

The extractor 502 produces an extract cut which is sent to blender 504. The SDA produces a pitch 58 (similar to that produced in FIG. 1) which is also sent to the blender 504. In blender 504, the extract from extractor 502 and the pitch 58 from SDA unit 100 are blended together to produce a blended asphalt cement meeting the described SHRP or similar specification, such as AC20. Properties of the extract cut can be tailored as needed by the operation of vacuum tower 104. Sulfur 119 is added to the blended asphalt cement.

Alternatively, the SDA deasphalted oil can be output to a hydrotreater (shown in dotted line only) which can then produce a hydrotreated stream for blending with conventional vacuum tower gas oil, raffinate, or any conventional FCC feed stream to feed the FCC unit 150.

The SDA-produced blend of the invention is prepared from i) 5 to 95 parts by weight SDA pitch obtained from the solvent deasphalted vacuum tower bottoms, ii) 0.5 to 50 parts by weight of lube plant extract obtained from the furfural treatment process of lubricating oils and iii) 0 to 90 parts by weight of an asphalt composition, e.g., AC5, produced from vacuum distillation of crude oils meeting the conventional Viscosity Graded Asphalt Cement specification set out in Table 1 to provide a blended asphalt composition. Sulfur in the form of elemental sulfur, available commercially from desulfurization of refinery streams, was added to the blended composition in amounts of 0.1 wt %, 0.3 wt %, and 0.5 wt %, and 2.0 wt % (comparative) at a temperature of 177° to 191° C. (350 to 375° F.) and then maintained at 191° C. (375° F.) for one to two hours while stifling. Rheological measurements were made according to "Standard Test Method for Determining the Rheological Properties of Asphalt Binder Using a Dynamic Shear Rheometer (DSR)" American Association of State Highway and Transportation Officials (AASHTO) Designation: TP5-93 to measure dynamic shear modulus and phase angle of asphalt binder when tested in dynamic (oscillatory) shear using parallel plate test geometry (in which the test sample is sandwiched between two relatively rigid parallel plates and subjected to oscillatory shear). This test method determines linear viscoelastic properties of asphalt binders. The test was carried out at oscillatory loading frequencies of 1 to 10 radians/second at temperatures of 58° C., 64° C., and 70° C., and both before and after Rolling Thin Film Oven Aging (RTFO). Values for the complex shear modulus (G*) divided by sin phase angle (delta) of asphalt binders were determined. This provides G*/sin delta, a value which is an indication of resistance to rutting at high temperatures for asphalt binders. Storage shear modulus, G', the complex shear modulus multiplied by the cosine of the phase angle expressed in degrees, which represents the in-phase component of the complex modulus that is a measure of the energy stored during a loading cycle, was also The addition of small amounts of sulfur provided improved rutting resistance equivalent to a full temperature upgrade of the asphalt. Results are provided in Table 2 below.

EXAMPLE 2 (Comparative)

The product of Example 1 was prepared except that 2.0 wt % sulfur was added to the lube plant extract portion first at 177° to 191° C. (350 to 375 F.) rather than to the blend. Lube plant extract/sulfur combination was then added to the composition. Despite having sulfur present in lube plant extract, rheological data indicate less effect to the final blend than exhibited by 0.1% added after all components together. The rheological measurements set out in Table 2 below suggest reduced resistance to rutting at high temperatures than sulfur-treated blends of the present invention.

MODIFICATIONS

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

TABLE 1

| Parameter | Units | Preferred | More Preferred | Most Preferred |
|---|---|---|---|---|
| Extract | % wt. | 0.5 to 50 | 3 to 30 | 5 to 25 |
| Extracting Boiling Range | ° C. | 93 to 704 | 121 to 621 | 149 to 593 |
| Asphalt Product | % wt. | 0.5 to 95 | 5 to 80 | 10 to 70 |
| Asphalt Product BP | ° C. | above 510 | above 538 | above 566 |
| Asphalt Viscosity | Poise | 200 to 5000 | 250 to 4000 | 300 to 3000 |

TABLE 2

| TEST: | B1777-139-1A STD. BLEND BEFORE RTFO Comparative | B1777-139-1B 0.1% SULFUR BEFORE RTFO Invention | B1777-139-1C 0.3% SULFUR BEFORE RTFO Invention | B1777-139-1D 0.5% SULFUR BEFORE RTFO Invention | B1777-139-2 2% SULFUR AE BEFORE RTFO Comparative | B1777-139-1A STD. BLEND AFTER RTFO Comparative | B1777-139-1B 0.1% SULFUR AFTER RTFO Invention | B1777-139-1C 0.3% SULFUR AFTER RTFO Invention | B1777-139-1D 0.5% SULFUR AFTER RTFO Invention |
|---|---|---|---|---|---|---|---|---|---|
| 58C G*/SIN DELTA | 2.021 | 2.285 | 2.858 | 3.002 | 2.13 | 8.447 | 5.59 | 6.817 | 7.494 |
| 58C G' | 0.105 | 0.1719 | 0.1688 | 0.2345 | 0.1409 | 1.216 | 0.6003 | 0.8293 | 0.9722 |
| 64C G*/SIN DELTA | 0.9243 | 1.084 | 1.28 | 1.363 | 0.9953 | 3.706 | 2.449 | 2.963 | 3.126 |
| 64C G' | 0.05113 | 0.09627 | 0.08447 | 0.1124 | 0.08827 | 0.424 | 0.2184 | 0.2896 | 0.3046 |
| 70C G*/SIN DELTA | 0.4561 | 0.5352 | 0.6226 | 0.6618 | 0.5239 | 1.691 | 1.158 | 1.382 | 1.589 |
| 70C G' | 0.03967 | 0.07506 | 0.06103 | 0.08352 | 0.01013 | 0.1741 | 0.1139 | 0.1311 | 0.1356 |
| 64C F.S. G*/SIN D 1 RAD/S | 0.1101 | 0.1551 | 0.1521 | 0.1763 | 0.106 | 0.4134 | 0.2791 | 0.3319 | 0.3763 |
| 64C F.S. G' @ 1 RAD/S | 0.02394 | 0.05687 | 0.03706 | 0.05581 | 0.002712 | 0.05736 | 0.04739 | 0.04478 | 0.04179 |
| 64C F.S. G*/SIN D 2RAD/S | 0.1975 | 0.2588 | 0.277 | 0.3059 | 0.2115 | 0.7858 | 0.524 | 0.6353 | 0.7265 |
| 64C F.S. G' @ 2 RAD/S | 0.0329 | 0.07281 | 0.05108 | 0.07283 | 0.005529 | 0.09473 | 0.0725 | 0.07483 | 0.07443 |
| 64C F.S. G*/SIN D 3RAD/S | 0.2866 | 0.3605 | 0.3982 | 0.4296 | 0.3155 | 1.147 | 0.7616 | 0.928 | 1.075 |
| 64C F.S. G' @ 3 RAD/S | 0.04061 | 0.08492 | 0.06253 | 0.08633 | 0.08867 | 0.1338 | 0.09669 | 0.105 | 0.1105 |
| 64C F.S. G*/SIN D 4RAD/S | 0.3747 | 0.4618 | 0.5184 | 0.5547 | 0.4192 | 1.516 | 0.9979 | 1.221 | 1.398 |
| 64C F.S. G' @ 4 RAD/S | 0.04765 | 0.09591 | 0.07329 | 0.09929 | 0.01224 | 0.177 | 0.1215 | 0.1371 | 0.1458 |
| 64C F.S. G*/SIN D 5RAD/S | 0.4666 | 0.5601 | 0.6384 | 0.6879 | 0.5226 | 1.866 | 1.236 | 1.514 | 1.717 |
| 64C F.S. G' @ 5 RAD/S | 0.05426 | 0.1061 | 0.8372 | 0.1129 | 0.01631 | 0.2203 | 0.1472 | 0.1704 | 0.1832 |
| 64C F.S. G*/SIN D 6RAD/S | 0.5575 | 0.6621 | 0.7655 | 0.8151 | 0.6235 | 2.21 | 1.476 | 1.795 | 2.053 |
| 64C F.S. G' @ 6RAD/S | 0.06147 | 0.1159 | 0.09463 | 0.1259 | 0.02056 | 0.2653 | 0.1748 | 0.2037 | 0.2255 |
| 64C F.S G*/SIN D 7RAD/S | 0.6409 | 0.76 | 0.8935 | 0.9435 | 0.7317 | 2.555 | 1.713 | 2.094 | 2.385 |
| 64C F.S G' @ 7 RAD/S | 0.06747 | 0.1255 | 0.1058 | 0.1383 | 0.02575 | 0.3119 | 0.2019 | 0.2409 | 0.2691 |
| 64C F.S G*/SIN D 8RAD/S | 0.7373 | 0.8576 | 1.001 | 1.061 | 0.8342 | 2.894 | 1.923 | 2.356 | 2.698 |
| 64C F.S. G' @ 8 RAD/S | 0.07479 | 0.1351 | 0.1153 | 0.1495 | 0.03069 | 0.3594 | 0.2262 | 0.274 | 0.3099 |
| 64C F.S G*/SIN D 9RAD/S | 0.8252 | 0.9513 | 1.108 | 1.18 | 0.9326 | 3.228 | 2.145 | 2.619 | 3.009 |
| 64C F.S G' @ 9 RAD/S | 0.08133 | 0.1439 | 0.1246 | 0.1618 | 0.03591 | 0.4073 | 0.2533 | 0.3082 | 0.3544 |
| 64C F.S G*/SIN D 10RAD/S | 0.9088 | 1.044 | 1.224 | 1.308 | 1.043 | 3.543 | 2.374 | 2.91 | 3.357 |
| 64C F.S. G' @ 10 RAD/S | 0.08803 | 0.1529 | 0.135 | 0.1747 | 0.04203 | 0.4541 | 0.2821 | 0.3474 | 0.4045 |

Reference to documents made in the specification is intended to result in such patents or literature being expressly incorporated herein by reference including any patents or other literature references cited within such documents.

What is claimed is:

1. A method for preparing asphalt composition free of added polymer, said asphalt composition comprising asphalt component and an optional flux component, which comprises treating said composition with 0.05 to 0.5 wt % reactive sulfur under conditions sufficient to improve rheological properties of said composition as measured by increased complex shear modulus relative to a corresponding untreated composition.

2. A method for preparing solvent deasphalting (SDA)-produced asphalt composition comprising a mixture containing SDA bottoms and lube plant extract which comprises treating said mixture with 0.05 to 0.5 wt % reactive sulfur under conditions sufficient to improve rheological properties of said composition as measured by increased complex shear modulus relative to a corresponding untreated mixture.

3. The method of claim 2 wherein said mixture contains 10 to 90 wt % SDA bottoms having a Ring And Ball Softening Point of 40° to 120° C., obtained from solvent extraction of vacuum bottoms, 0.5 to 50 wt % lube plant extract of 10 to 1000 SUS obtained from tube production, and said conditions comprise heating at temperatures of 100° to 300° C. for 0.1 to 5 hours.

4. The method of claim 3 wherein said mixture further comprises 5 to 95 wt % asphalt cement of 100 to 5000 poises at 60° C. obtained from atmospheric distillation bottoms.

5. The method of claim 2 wherein said mixture contains 10 to 90 wt % SDA bottom,, having a Ring and Ball Softening Point of 40° to 120° C., obtained from solvent extraction of vacuum bottoms, 3 to 30 wt % lube plant extract of 50 to 800 SUS obtained from lube production, and 5.0 to 90 wt % of vacuum bottoms obtained from vacuum distillation, and said conditions comprise heating at temperatures of 110° to 250° C. for 0.2 to 2 hours.

6. The method of claim 2 wherein said reactive sulfur is added in a mount s ranging from 0.1 to 0.5 wt % at 110° to 250° C.

7. The method of claim 2 wherein said mixture further comprises asphalt cement obtained from atmospheric distillation bottoms.

8. The method of claim 2 wherein said mixture further comprises styrene-butadiene copolymers or styrene-butadiene-styrene (SBS).

9. The method of claim 2 wherein said mixture consists essentially of SDA bottoms, lube plant extract and optionally, at least one element selected from the group consisting of vacuum bottoms, and asphalt cement obtained from atmospheric distillation bottoms.

10. An asphalt composition free of added polymer which comprises an asphalt component and an optional fluxing component, which composition is treated with 0.05 to 0.5 wt % reactive sulfur under conditions sufficient to improve rheological properties of said composition as measured by increased complex shear modulus relative to a corresponding untreated composition.

11. An asphalt composition comprising a mixture containing solvent deasphalting bottoms, and lube plant extract, which mixture is treated with 0.05 to 0.5 wt % reactive sulfur under conditions sufficient to improve rheological properties of said composition as measured by increased complex shear modulus relative to a corresponding untreated mixture.

12. The composition of claim 11 wherein said mixture contains 10 to 90 wt % SDA bottoms having a Ring And Ball Softening Point of 40° to 120° C., obtained from solvent extraction of vacuum bottoms, 0.5 to 50 wt % lube plant extract of 10 to 1000 SUS obtained from lube production, and said conditions comprise heating at temperatures of 100° to 300° C. for 0.1 to 5 hours.

13. The composition of claim 12 wherein said mixture further comprises 5 to 95 wt % asphalt cement of 100 to 5000 poises at 60° C. obtained from atmospheric distillation bottoms.

14. The composition of claim 12 wherein said mixture consists essentially of SDA bottoms, lube plant extract and optionally, at least one element selected from the group consisting of vacuum bottoms, and asphalt cement obtained from atmospheric distillation bottoms.

15. The composition of claim 11 wherein said mixture contains 10 to 90 wt % SDA bottoms having a Ring and Ball Softening Point of 40° to 120° C., obtained from solvent extraction of vacuum bottoms, 3 to 30 wt % lube plant extract of 50 to 800 SUS obtained from lube production, and 5.0 to 90 wt % of vacuum bottoms obtained from vacuum distillation, and said conditions comprise heating at temperatures of 110° to 250° C. for 0.2 to 2 hours.

16. The composition of claim 11 wherein said reactive sulfur is added in amounts ranging from 0.1 to 0.5 wt % at 110° to 250° C.

17. The composition of claim 11 wherein said mixture further comprises asphalt cement obtained from atmospheric distillation bottoms.

18. The composition of claim 11 wherein said mixture further comprises styrene-butadiene copolymers or styrene-butadiene-styrene (SBS).

19. A pavement composition comprising aggregate and from 1.0% to 10.0% of a paving asphalt composition free of added polymer which comprises an asphalt component and an optional fluxing component, which composition is treated with 0.05 to 0.5 wt % reactive sulfur under conditions sufficient to improve rheological properties of said composition as measured by increased complex shear modulus relative to a corresponding untreated composition.

20. A pavement composition comprising aggregate and from 1.0% to 10.0% of a paving asphalt composition comprising a mixture containing solvent deasphalting bottoms and lube plant extract, which mixture is treated with 0.05 to 0.5 wt % reactive sulfur under conditions sufficient to improve rheological properties of said composition as measured by increased complex shear modulus relative to a corresponding untreated mixture.

* * * * *